United States Patent
Lawrence et al.

(10) Patent No.: US 11,427,891 B2
(45) Date of Patent: Aug. 30, 2022

(54) LOW SILICON COPPER ALLOY PIPING COMPONENTS AND ARTICLES

(71) Applicant: NIBCO INC., Elkhart, IN (US)

(72) Inventors: Benjamin L. Lawrence, Elkhart, IN (US); Rudy L. Smith, Mission, TX (US); Wesley D. Coy, McAllen, TX (US); Kenneth Edgar McCoy, South Bend, IN (US); Todd Morehead, McAllen, TX (US)

(73) Assignee: NIBCO Inc., Elkhart, IN (US)

( * ) Notice: Subject to any disclaimer, the term of this patent is extended or adjusted under 35 U.S.C. 154(b) by 131 days.

(21) Appl. No.: 16/521,189

(22) Filed: Jul. 24, 2019

(65) Prior Publication Data

US 2021/0025030 A1 Jan. 28, 2021

(51) Int. Cl.
  *C22C 9/04* (2006.01)
  *F16L 55/07* (2006.01)

(52) U.S. Cl.
  CPC .............. *C22C 9/04* (2013.01); *F16L 55/07* (2013.01)

(58) Field of Classification Search
  CPC .................................... C22C 9/04; F16L 55/07
  See application file for complete search history.

(56) References Cited

U.S. PATENT DOCUMENTS

| | | |
|---|---|---|
| 1,933,390 A | 10/1933 | Ray et al. |
| 1,954,003 A | 4/1934 | Vaders |
| 5,893,953 A | 4/1999 | Bhargava |
| 6,413,330 B1 | 7/2002 | Oishi |
| 7,354,489 B2 | 4/2008 | Hofmann et al. |
| 7,628,872 B2 | 12/2009 | Zhang et al. |
| 9,217,191 B2 | 12/2015 | Gulbrandsen Dahl et al. |
| 9,951,400 B1 * | 4/2018 | McDevitt .................. C22C 9/04 |
| 2004/0234411 A1 * | 11/2004 | Hofmann .................. C22C 9/10 |
| | | 420/473 |
| 2004/0234412 A1 * | 11/2004 | Oishi ........................ C22F 1/08 |
| | | 420/477 |
| 2008/0318079 A1 | 12/2008 | Ballantyne et al. |
| 2009/0092517 A1 | 4/2009 | Kosaka et al. |

(Continued)

FOREIGN PATENT DOCUMENTS

| | | |
|---|---|---|
| DE | 4324008 A1 * | 1/1995 |
| DE | 4324008 A1 | 1/1995 |

(Continued)

OTHER PUBLICATIONS

Tyler et al.; Introduction to Copper and Copper Alloys; 1990, ASM; vol. 2; p. 216-240 (Year: 1990).*

(Continued)

*Primary Examiner* — Christopher S Kessler
(74) *Attorney, Agent, or Firm* — Price Heneveld LLP (57) ABSTRACT

A piping article is provided that comprises a piping component comprising a piping body with an open end. The piping component is formed of an alloy comprising from about 12% to about 16% zinc, from about 0.5% to about 2.0% silicon, and a balance of copper (by weight). The alloy comprises an ultimate tensile strength of from about 200 N/mm$^2$ to about 300 N/mm$^2$, a yield strength of from about 75 N/mm$^2$ to about 225 N/mm$^2$, and an elongation of from about 15% to about 60%.

18 Claims, 3 Drawing Sheets

(56) References Cited

U.S. PATENT DOCUMENTS

| | | | |
|---|---|---|---|
| 2009/0280026 A1* | 11/2009 | Strobl | C22C 9/04 |
| | | | 420/472 |
| 2015/0376736 A1 | 12/2015 | Schroeder et al. | |
| 2016/0069483 A1 | 3/2016 | Bobo et al. | |
| 2016/0102385 A1 | 4/2016 | Murray et al. | |
| 2017/0145544 A1 | 5/2017 | Lazarus | |
| 2017/0204979 A1 | 7/2017 | Yoder et al. | |
| 2018/0148813 A1 | 5/2018 | Yang et al. | |

FOREIGN PATENT DOCUMENTS

| | | | | |
|---|---|---|---|---|
| EP | 0274586 A1 * | 7/1988 | | C22C 9/04 |
| GB | 1443090 | 7/1976 | | |
| JP | H0347932 A | 2/1991 | | |
| JP | H0368731 A * | 3/1991 | | |
| JP | H04246141 A * | 9/1992 | | |
| WO | 2011066581 A1 | 6/2011 | | |
| WO | 2017127284 A1 | 7/2017 | | |

OTHER PUBLICATIONS

Copper Development Association, Copper Alloy Data: Copper Alloy C23000, 2022, Copper Development Association , p. 4 (Year: 2022).*

C87440, Brasses (C83300-C89999), Application Datasheet Standard Designation for Wrought Copper Alloys, Copper Development Association Inc., Revision date: Jun. 19, 2019, at 56, available at https://www.copper.org/resources/properties/db/datasheets/all-alloys.pdf.

* cited by examiner

LOW SILICON COPPER ALLOY PIPING COMPONENTS AND ARTICLES

TECHNICAL FIELD

The disclosure relates to valves, fittings, flanges, assemblies and other piping components made from low silicon copper alloys and configured to have a wide range of service applications due to the compatibility of the low silicon copper alloys with multiple production methods, joinery methods, and service applications.

BACKGROUND

Over the past few years, connection methods for piping systems have expanded from traditional joinery methods, including threading, welding, soldering and brazing, to include other joinery methods, including compression, press, push, and slip connections. This expansion of joinery methods was driven largely by the need for installation and connection of piping components to be done more quickly, safely and simply with less expense but without sacrificing critical qualities of performance. Additionally, regulatory oversight of the plumbing industry has driven an increase in regulation of water systems to address human health and environmental concerns.

Accordingly, there is a need for piping components made from low silicon copper alloys compatible with multiple production methods, joinery methods, and service applications.

BRIEF SUMMARY

A first aspect of the disclosure is a piping article that includes a piping component including a piping body with an open end. The piping component is formed of an alloy comprising from about 12% to about 16% zinc, from about 0.5% to about 1.8% silicon, and a balance of copper (by weight). The alloy comprises an ultimate tensile strength of from about 200 N/mm$^2$ to about 300 N/mm$^2$, a yield strength of from about 75 N/mm$^2$ to about 225 N/mm$^2$, and an elongation of from about 15% to about 60%.

Another aspect of the disclosure is a piping article that includes a piping component including a piping body with an open end. The piping component is formed of an alloy consisting essentially of from about 12% to about 16% zinc, from about 0.5% to about 1.8% silicon, and a balance of copper (by weight). The alloy comprises an ultimate tensile strength of about 300 N/mm$^2$ or less, a yield strength of about 225 N/mm$^2$ or less, and an elongation of about 60% or less.

Another aspect of the disclosure is a piping article that includes a piping component including a piping body with an open end. The piping component is formed of an alloy consisting essentially of from 12% to 16% zinc, from 0.5% to 2% silicon, one or more of (i) from 0.02% to 0.09% phosphorous, (ii) from 0.02% to 0.09% arsenic, (iii) from 0.02% to 0.09% antimony, and (iv) from 0.05% to 0.2% iron, and a balance of copper (by weight). The alloy comprises an ultimate tensile strength of about 300 N/mm$^2$ or less, a yield strength of about 225 N/mm$^2$ or less, and an elongation of about 60% or less.

These and other features, advantages, and objects of the disclosure will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views may be shown exaggerated in scale or in schematic in the interest of clarity and conciseness.

In the drawings.

DETAILED DESCRIPTION

For purposes of description herein, the aspects of this disclosure may assume various alternative orientations, except where expressly specified to the contrary. The specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed examples of the present disclosure are disclosed herein. However, it is to be understood that the disclosed examples are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

It should also be understood that the term "fluids" as used herein includes steam, liquids, gasses, and other mixed or processed media.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

Figure 1:
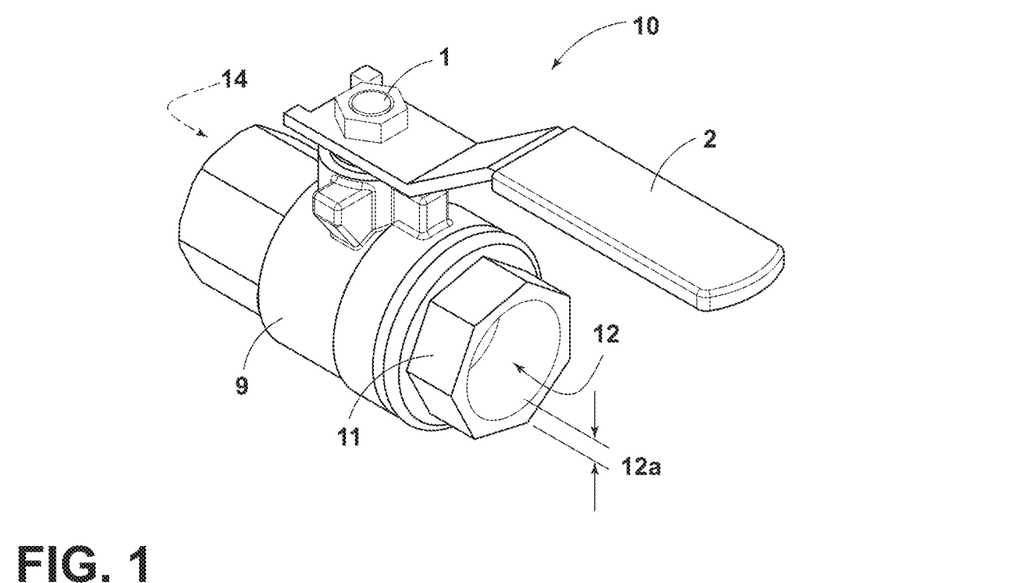
FIG. 1 is a perspective view of a valve assembly according to various examples.
Figure 2:
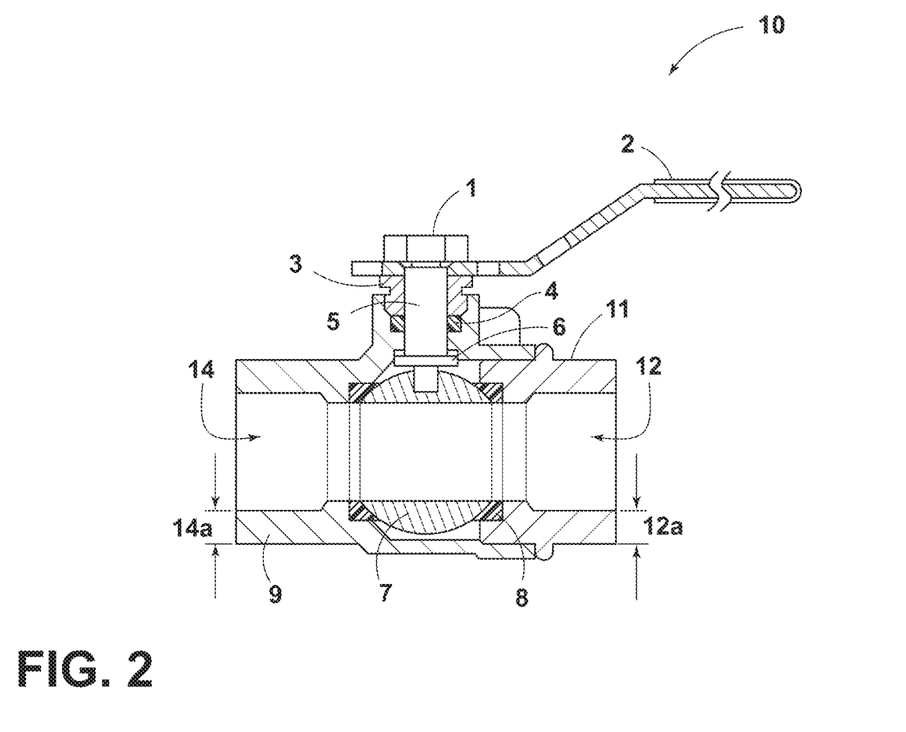
FIG. 2 is a side, cross-sectional view of the valve assembly of FIG. 1.

Referring to FIGS. 1 and 2, a valve assembly 10 for controlling the flow of fluids is depicted according to one aspect of the disclosure. As depicted, the valve assembly 10 may include standard valve components including, but not limited to, a handle nut 1, a handle 2, a threaded pack gland 3, a packing 4, a stem 5, a thrust washer 6, a vented ball 7 and a seat ring 8. These components are conventionally arranged within the valve assembly 10. Further, these components function as known in the field of this disclosure.

In addition, the valve assembly 10 may include a valve body 9 and an end piece 11. As shown in FIGS. 1 and 2, the inlet end 12 of the valve assembly 10 is located within the end piece 11. The outlet end 14 of the valve assembly 10 is located within the valve body 9. The valve assembly 10 may control and restrict the flow of fluid from the inlet end 12 to the outlet end 14. For example, the handle 2 may be operatively connected to the ball 7 and, accordingly, an operator may rotate the handle 2 to move the ball 7 to a position in which the ball 7 blocks the flow of fluid from the inlet end 12 to the outlet end 14. Similarly, an operator can rotate the handle 2 to another position to move the ball 7 to a position in which the ball 7 does not block the flow of fluid from the inlet end 12 to the outlet end 14.

The valve body 9, the end piece 11, and other components of the valve assembly 10 may be formed from a low silicon copper alloy which allows the components to be fabricated using one of multiple production methods. The fabrication of certain components of the valve assembly 10 from a low silicon copper alloy facilitates the formation of the valve assembly 10 by multiple production methods and the use of the valve assembly 10 with multiple joinery methods and/or in multiple service applications. The wall thickness 12a (at the inlet end 12) and the wall thickness 14a (at the outlet end 14) of the valve assembly 10 may be modified during production, and each end 12, 14 may include tapered ends, grooves, stops, or other features to further facilitate one or multiple joinery methods. Further, a gripper ring (not shown) may be included within one or both of the inlet end 12 and the outlet end 14, depending on the selected joinery method used with the valve assembly 10. Other components of the valve assembly 10 in contact with the fluids at the operating temperatures and pressures, e.g., the ball 7, may also be fabricated from the disclosed low silicon copper alloys.

In some examples, the low silicon copper alloys used to fabricate the components of the valve assembly 10 may be a low silicon copper alloy comprising from about 12% to about 16% zinc, from about 0.5% to about 1.8% silicon, and a balance of copper (by weight). In other examples, the low silicon copper alloy may comprise from about 12% to about 16% zinc, from about 0.5% to about 2% silicon, one or more of (i) from about 0.02% to about 0.09% phosphorous, (ii) from about 0.02% to about 0.09% arsenic, (iii) from about 0.02% to about 0.09% antimony, and (iv) from about 0.05% to about 0.2% iron, and a balance of copper (by weight). Other elements such as a lead, aluminum, tin, and/or manganese may be added in low concentrations (less than 0.1% by weight). Additional trace elements may also be present in the low silicon copper alloy.

Specifically, in some examples, the low silicon copper alloys may have a composition consisting essentially of from about 12% to about 16% zinc, from about 0.5% to about 1.8% silicon, and a balance of copper (by weight). In other examples, the low silicon copper alloy may have a composition consisting essentially of from about 12% to about 16% zinc, from about 0.5% to about 2.0% silicon, less than about 0.09% lead, less than about 0.09% aluminum, and a minimum of about 80% copper (by weight). In another example, the low silicon copper alloy may have a composition consisting essentially of from about 12% to about 16% zinc, from about 0.5% to about 2.0% silicon, equal to or less than about 0.20% iron, low, or trace concentrations of one or more of phosphorus, arsenic, antimony, lead, aluminum, tin, manganese, and nickel, and a balance of copper (by weight). In yet another example, the low silicon copper alloy may have a composition consisting essentially of from about 14% to about 16% zinc, from about 0.5% to about 1.0% silicon, from about 0.10% to about 0.20% iron, less than about 0.02% of one or more of phosphorus, arsenic, antimony, lead, aluminum, tin, manganese, and nickel, and a balance of copper (by weight). In another example, the low silicon copper alloy may have a composition consisting essentially of 12% to 14% zinc, 0.5% to 1.0% silicon, less than 0.10% iron, less than 0.02% of one or more of phosphorus, arsenic, antimony, lead, aluminum, tin, manganese, and nickel, independently, and a balance of copper (by weight).

The low silicon copper alloys used for fabricating the valve assembly 10 and having the above-referenced compositions may exhibit specific mechanical and thermal properties. Specifically, for example, the low silicon copper alloys may exhibit mechanical properties such as an ultimate tensile strength of about 300 $N/mm^2$ or less, a yield strength of about 225 $N/mm^2$ or less, and an elongation of about 55% or less. Further, as another example, the low silicon copper alloy may have an ultimate tensile strength of about 200 $N/mm^2$ to about 300 $N/mm^2$, a yield strength of about 75 $N/mm^2$ to about 225 $N/mm^2$, and an elongation of about 15% to about 55%. In yet another example, the low silicon copper alloy may have an ultimate tensile strength of about 150 $N/mm^2$ to about 300 $N/mm^2$, a yield strength of about 50 $N/mm^2$ to about 225 $N/mm^2$, and an elongation of about 15% to about 40%. In another example, the low silicon copper alloy may have an ultimate tensile strength of about 200 $N/mm^2$ to about 300 $N/mm^2$, a yield strength of about 75 $N/mm^2$ to about 225 $N/mm^2$, and an elongation of about 15% to about 35%. Further, the low silicon copper alloy used for fabricating the valve assembly 10 may exhibit a thermal conductivity of about 45 W/m·K to about 70 W/m·K.

The low silicon copper alloys, along with the valve assembly 10 and other piping components of the disclosure made from the low silicon copper alloys, result in the foregoing thermal and mechanical properties, which can enable the use of multiple joinery methods and fabrication methods. In contrast, conventional alloys, and the piping components made from conventional alloys, have mechanical and thermal properties suitable for one or only a few related joinery methods (e.g., brazing, welding, and soldering), making them more costly to use and less desirable for consumers and technicians.

Table 1 below illustrates exemplary selected ranges for the composition of the low silicon copper alloys disclosed herein. The use of a low silicon copper alloy with the composition detailed below in Table 1, as having the mechanical and thermal properties previously discussed, enables the valve assembly 10 to be fabricated using multiple fabrication methods. Likewise, the fabrication of the valve assembly 10 using the low silicon copper alloys of the disclosure enables the valve assembly 10 to be joined to other components with multiple joinery methods. Further, the alloys of the disclosure can result in the compatibility of the valve assembly 10 (and other piping components fabricated from these alloys) in multiple service applications.

TABLE 1

| Element | Content (by weight) |
| --- | --- |
| Zinc | 12%-16% |
| Silicon | 0.5%-2.0% |
| Phosphorous | 0.02%-0.09% |
| Arsenic | 0.02%-0.09% |
| Antimony | 0.02%-0.09% |
| Iron | 0.05%-0.20% |
| Lead | ≤0.1% |
| Aluminum | ≤0.1% |
| Tin | ≤0.1% |
| Manganese | ≤0.1% |
| Nickel | ≤0.1% |

With respect to the fabrication of piping components from the disclosed low silicon copper alloys, the composition detailed above in Table 1 allows the low silicon copper alloys to exhibit the necessary mechanical and thermal properties that enable the resulting piping components to be fabricated using multiple methods such as, for example, casting, forging, extrusion, or machining. Specifically, individual elements of the composition may provide certain properties for facilitating the multiple production methods, as discussed in detail below.

For example, maintaining levels of zinc above about 12% by weight, as specified in Table 1, ensures that the disclosed low silicon copper alloys are forgeable. However, the levels of zinc and silicon in the disclosed low silicon copper alloys are low enough (i.e., at or less than about 16% and about 2%, respectively), so as to remain in solid solution within a single alpha phase. Within the alpha phase of the low silicon copper alloys, the cored dendritic structure allows for a segregation of alloying elements, including zinc and silicon. The concentration of these elements varies from zero at the dendrite center to a maximum along the dendrite outer edge. Upon forging, the dendritic structure is broken down, resulting in an equiaxed grain structure of alpha copper solid solution, free of alloying element segregation.

Generally, dendritic zinc segregation within pre-forged alloys aids forging, increasing hot workability as the level of zinc increases. The low silicon copper alloys of the disclosure include a relatively high level of zinc (e.g., up to about 16%) to take full advantage of dendritic zinc segregation within the low silicon copper alloys with respect to forging without promoting an amount of segregate that creates an issue with dezincification corrosion that cannot be addressed though addition of other elements (phosphorous, arsenic, antimony, iron, lead, aluminum, tin, manganese, nickel). In contrast, dendritic segregation of silicon throughout a pre-forged alloy may create areas of local restriction to forging by decreasing hot workability. The level of silicon (e.g., at or below 2% by weight) of the low silicon copper alloys of the disclosure limits silicon to a level that prevents the silicon from decreasing the hot workability of the forged alloy. Maintaining levels at or below 2% by weight of silicon also ensures that the hot metal is able to flow with greater ease within a die, reducing die wear and increasing overall forgeability of the low silicon copper alloys.

With respect to at least casting, the addition of silicon to a low target level within the low silicon copper alloys of the disclosure results in a high metal fluidity, as discussed above with reference to the die for forging. The high metal fluidity enables the disclosed low silicon copper alloys to also flow readily into a mold for casting fabrication. However, a higher level of silicon may also cause high levels of alloy gassing that may cause casting porosity. Maintaining silicon levels at or below about 2% by weight, as detailed in Table 1 with reference to the disclosed low silicon copper alloys, reduces the amount of silicon available to react with oxygen during casting and reduces the formation of silicon oxides and gassing, which may prevent problems caused by casting porosity. The level of zinc within the disclosed range of Table 1 (e.g., from about 12% to about 16% by weight) aids in the dampening of alloy gassing, particularly of silicon, thus increasing casting quality. The level of zinc as disclosed also ensures that piping components cast from the low silicon copper alloys of the disclosure do not suffer an appreciable loss in strength during fabrication.

With respect to at least machining, the levels of silicon within a range of from about 0.5% to about 2.0% by weight and the levels of zinc within a range of from about 12% to about 16% by weight, as disclosed in Table 1 above, provide the low silicon copper alloys with a strength that is low enough so that the disclosed alloys are also machinable. Specifically, because of the disclosed levels of zinc and silicon, the low silicon copper alloys include a greater concentration of zinc and silicon along structural dendritic boundaries within the alloy, as discussed above with respect to forging. The greater concentrations of silicon and zinc along the structural dendritic boundaries act as effective chip breakers to facilitate machining. Further, because the levels of silicon are at or below about 2% by weight, any negative effects on machine tools caused by silicon being a hard microstructural constituent may be mitigated by the disclosed silicon content when machining piping components fabricated from the disclosed low silicon copper alloys.

Fabrication of piping components from the disclosed low silicon copper alloys, as detailed above in Table 1, by any one of the fabrication methods discussed herein, or by other methods not specifically addressed, allows the resulting piping components to exhibit the necessary mechanical and thermal properties to be used in multiple joinery methods such as, for example, soldering, brazing, welding, press connections, threading, compression connections, and/or slip connections. Generally, many joinery methods require a range of mechanical and thermal properties for proper application. The disclosed alloy compositions provide the necessary properties for compatibility of piping components fabricated from these alloys with multiple joinery methods, as discussed in detail below.

For example, with respect to at least soldering, an alloy that possesses a reasonably high thermal conductivity is preferred for a solder connection. For example, high silicon alloys (e.g., a C 87850 alloy, a C 87600 alloy, and/or a C 87850 alloy) are traditionally used in soldering for their thermal conductivity properties. The silicon level (i.e., 0.5% to 2.0% silicon by weight, as detailed in Table 1 above) of the disclosed low silicon copper alloys is lower than the silicon levels (i.e., 2.5% to 5.0% silicon by weight) of the high silicon alternatives. The lower silicon level of the disclosed low silicon copper alloys produces a thermal conductivity that is higher than the thermal conductivity of the high silicon alternatives, allowing heat to be transferred more easily and uniformly throughout the solder joint. Further, the silicon of the high silicon alternatives tends to transform into a deleterious surface layer of silicon oxide upon exposure to high temperatures and air. This layer is not easily removed by fluxes and may promote a barrier that impedes the ability of the solder to wet the joint surface and flow into the joint gap. The lower silicon level of the low silicon copper alloys as compared to the high silicon alternatives reduces the formation of the silicon oxide. Good heat flow due to the high thermal conductivity of the low silicon copper alloys also allows a flux that is applied to the joint prior to soldering to be uniformly activated without areas of burning. The activation can at least partially remove the silicon oxide from the mating pieces of the piping components, preventing the oxides from interfering with surface wetting and capillary flow of solder within the joint gap. Thus, piping components fabricated from the disclosed low silicon copper alloys may be joined by soldering, and the reduced formation of silicon oxide may even improve solderability of the disclosed low silicon copper alloys as compared to the traditionally used high silicon alternatives.

With respect at least to welding and brazing, variations between the melting point of copper and the boiling point of added elements in a copper-based alloy may impact the strength of said alloy. For example, elemental zinc has a boiling point of about 1,665° F. which is below the melting point of copper (typically between 1,800° F. and about 1,990° F.). This difference causes zinc to evaporate, or vaporize, during welding or brazing of a copper-based alloy including zinc. Zinc vaporization may cause gas-hole defects in the copper-based alloy if too much zinc is added, which may negatively impact the structural soundness of the weld. Reduction in mechanical strength due to zinc vaporization and resulting gas-hole defects may also cause affected components to distort under the weight of joinery members, particularly when considering installation brazing of large diameter piping components.

However, the zinc content (i.e., 12% to 16% zinc by weight) of the low silicon copper alloys disclosed above in Table 1 is low enough to prevent detrimental amounts of zinc vaporization within the heat affected zone (HAZ) during at least brazing or welding. Further, the low silicon level (i.e., about 0.5% to about 2.0% silicon by weight) of the disclosed low silicon copper alloys increases thermal conductivity of the disclosed alloys, as discussed previously. This increased thermal conductivity results in more even heating of the disclosed alloys and a reduction of the tendency of the disclosed alloys to develop high localized heating of the weldment as compared to typical copper-based alloys. The reduced localized heating prevents development of hot spots that may be more susceptible to zinc vaporization, further limiting zinc vaporization within the disclosed alloys during brazing or welding. While some zinc may be lost from the disclosed alloys during joinery, due to the limited zinc vaporization as a result of the disclosed levels of silicon and zinc in Table 1, the low silicon copper alloys remain stable without appreciable loss of mechanical strength, distortion of the joinery members, and/or other structural change due to zinc vaporization. For example, when a disclosed low silicon copper alloy that includes about 16% by weight is used, the limited amount of zinc and added resistance from the disclosed content of silicon together limit zinc vaporization to a level that reduces the zinc content to only about 15% when brazed or welded. This low amount of reduction also improves corrosion resistance and dezincification resistance, particularly in combination with the inherent post-weld rapid cooling. Thus, piping components fabricated from the disclosed low silicon copper alloys may also be joined by brazing or welding and, when brazed or welded, may even exhibit an increased resistance to corrosion and dezincification as compared to typical copper-based alloys.

With respect to at least press connections, traditional press articles are fabricated from copper tube (e.g., a C 12200 alloy) that is in a light drawn or annealed condition. The traditional copper tube is selected to achieve the ductility and mechanical strengths necessary to allow the press articles to be deformed or pressed to provide a suitable mechanical attachment while still maintaining adequate mechanical and structural integrity after being pressed. The low silicon copper alloys of the disclosure are characterized by similar mechanical properties, including ductility (measured by percent elongation) and yield strength, and may be used to fabricate press articles in place of the copper tube alternative. By limiting the zinc content to less than about 16% by weight, as disclosed in Table 1 above, the disclosed low silicon copper alloys maintain the ductility necessary for press connections without being susceptible to cracking during pressing. The lower silicon also facilitates the necessary ductility for press connections and/or other cold deformation joinery methods. Specifically, the high elongation (up to about 60%) exceeds the ductility of even a C 12200 soft grain alloy (up to about 45%), as discussed elsewhere herein. The yield strength (about 225 N/mm$^2$ or less) is comparable to the yield strength of a light drawn C 12200 alloy (about 221 N/mm$^2$) and is thus low enough to facilitate press and other mechanical deformation joinery processes of the piping components, as discussed elsewhere herein.

With respect to at least cross-linked polyethylene (PEX) connections and other push connection fittings that utilize barbs to grip an interior of a received tube to maintain the connection, the disclosed low silicon copper alloys provide beneficial levels of corrosion resistance and high machinability, as discussed previously. For these connections, the sharp barbed connection end must be formed within the piping component. The barbed connection end is fitted within the mated plastic tubing and is fully exposed to the system media. This requires the alloy of the piping component to be resistant to corrosion. As discussed above, the low susceptibility of the disclosed alloys to dezincification increases the corresponding resistance to corrosion. Specifically, by maintaining a limited concentration of silicon (at or below about 2% by weight, as disclosed in Table 1) and a zinc concentration below about 16% by weight, the compositions of the low silicon copper alloys as disclosed provide resistance to dezincification corrosion, as discussed above, and to other forms of de-alloying corrosion.

For use with PEX connections and push connections, the disclosed low silicon copper alloys must also allow for the barbs of the barbed end to be sharp enough to dig into the plastic tubing. The disclosed alloys are machinable and therefore allow formation of said barbs. The alloys of the disclosure also exhibit high mechanical strengths which are necessary to hold up to the force of crimping metallic rings when connecting the piping component with the outer plastic tube. Thus, the disclosed low silicon copper alloys may be used for PEX connection and push connection piping components as the disclosed alloys provide the necessary corrosion resistance, machinability, and mechanical strengths necessary for these connection types in addition to exhibiting the necessary properties for the multiple other connection types discussed previously.

With respect to service, the previously discussed resistance of the disclosed alloys to de-alloying corrosion and/or dezincification allows the piping components formed of these disclosed alloys to be used in a wide range of applications. For example, the piping components may be used in applications that may include water with high levels of oxygen, slow-moving water, soft water, and other fluids that may react with zinc. However, while the addition of silicon may increase corrosion resistance, the addition of silicon may also result in an increase in mechanical strengths. The resulting strength enhancement may limit the useful application and/or performance of the product. As such, the disclosed low silicon copper alloys have silicon added in a limited concentration (at or below 2% by weight) to provide the increased corrosion resistance while maintaining the necessary mechanical strengths for the multiple fabrication and joinery methods.

According to various embodiments, while the contents of zinc and silicon in the disclosed alloys provide many of the properties necessary for the use of multiple fabrication and joinery methods in the same component, the addition of other elements (e.g., phosphorous, arsenic, antimony, iron, lead, aluminum, tin, manganese, or nickel), as detailed above in Table 1 with regard to the disclosed low silicon copper alloys, can also play an important role in achieving the properties discussed above. In various examples, these elements may be trace elements within the disclosed alloy. In other examples, these elements may be added to further achieve the specified mechanical properties of the disclosed low silicon copper alloys in particular cases, as discussed below.

Phosphorous, for example, may be used as a grain refiner for cast copper base alloys where clay bonded sand molds are used for casting. Clay bonded sand molds provide alloys a more gradual cooling rate from a molten state to a solid state than is provided by permanent metal molds or forging methods. The slower cooling allows more time for larger grain growth. The use of phosphorous in the disclosed low silicon copper alloys as laid out in Table 1 creates points of grain initiation through the alloy matrix, refining the structural grains and resulting in higher strengths for the disclosed alloys. This contributes to making the disclosed alloys suitable for casting piping components of the disclosed alloys and for using said piping components with multiple joinery methods.

As another example, while iron has not been widely recognized as a grain refiner for copper based alloys, the addition of iron has been shown to provide grain refining benefits, including enhancing mechanical strength, without negatively impacting the basic benefits for the respective copper based alloy. With respect to the disclosed alloys, maintaining iron at less than 0.20% by weight, as shown in Table 1 above, provides increased mechanical strength through grain refinement without significantly impairing other performance outcomes. For example, while the iron content of the disclosed alloys promotes high mechanical strength, maintaining the iron content at less than 0.20% by weight allows the disclosed alloys to also maintain the necessary thermal conductivity for welding, soldering, and brazing, as discussed above.

In other examples, lead has a low melting point, 621.4° F. which allows for significant reductions and a near-elimination of the lead content in the disclosed low silicon copper alloys further facilitates the use of the disclosed alloys with brazing and/or soldering joinery methods. The lead content of the disclosed alloys also provides the mechanical strengths necessary for fabricating piping components of the disclosed alloys using machining and further facilitates using the disclosed alloys with press, push, or other deformation joinery methods. Specifically, because the lead content of the disclosed alloys is maintained at less than 0.09% by weight, as shown in Table 1 above, the disclosed alloys do not have an interruptive phase that is vulnerable to cracking when mechanically deformed.

Further, arsenic, antimony, phosphorous, iron, or any combination thereof may be included in the composition of the disclosed alloys, as detailed in Table 1, for enhancing the corrosion resistance of the low silicon copper alloy. In still other examples, with respect to mechanical strength of the disclosed alloys, aluminum, tin, manganese, and nickel may be used in the compositions of Table 1 to increase the mechanical strengths of the disclosed low silicon copper alloys. In order to maintain the lower strengths needed to facilitate press connections and other deformation joinery methods, the content of aluminum, tin, manganese, and nickel of the disclosed alloys is limited to a maximum of 0.03% by weight. In yet other examples, the addition of nickel may increase the stability of the alloy in high temperature service. Lead, aluminum, tin, and/or manganese may also be added to the disclosed low silicon copper alloys to allow utilization of lower cost scrap streams without negatively impacting the properties necessary for using the disclosed low silicon copper alloy with the multiple fabrication and joinery methods.

For the reasons set forth above, the use of the disclosed low silicon copper alloys detailed in Table 1 above for valve assembly 10 and other piping components is advantageous for using multiple fabrication and joinery methods with a single piping component. These alloys may also provide additional benefits with respect to one or more fabrication and joinery methods. For example, the disclosed alloys may be used to fabricate the elbow fitting 40 shown in FIGS. 3 and 4. As depicted according to some aspects of the disclosure, the elbow fitting 40 may include standard features of an elbow fitting including, but not limited to, an elbow body 41, inlet 42, flange 43 and outlet 44. These features are conventionally arranged within the elbow fitting 40 and generally function as known in the field. For example, the inlet end 42 and the outlet end 44 of the body 41 allow the elbow fitting 40 to control the flow of fluid from the inlet end 42 to the outlet end 44. Further, the wall thickness 42a (at the inlet end 42) and the wall thickness 44a (at the outlet end 44) of the elbow body 41 may be modified during fabrication, and the ends 42, 44 may be configured to include tapered ends, grooves, stops, or other features to further facilitate use of the elbow fitting 40 with one or multiple joinery methods. In various examples, the inlet end 42 and the outlet end 44 may include threading for joinery methods. In other examples, the inlet end 42 and the outlet end 44 may be unthreaded. In still other examples, the inlet end 42 and the outlet end 44 may have teeth or barbs positioned to facilitate gripping of a pipe when the pipe is received by the elbow fitting 40.

Figure 3:
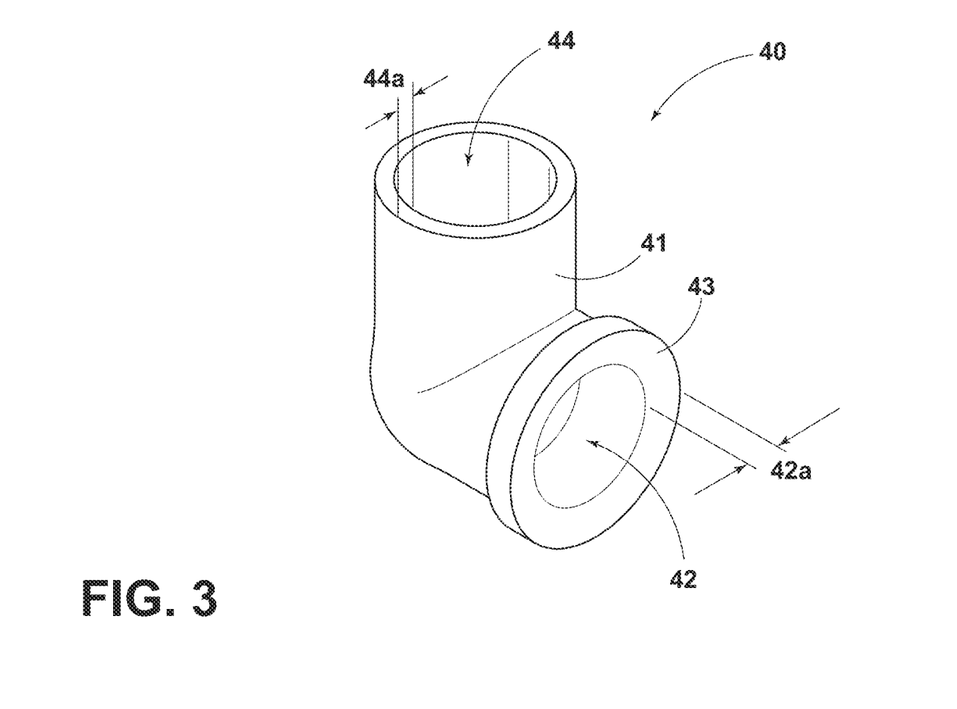
FIG. 3 is a perspective view of a piping component according to various examples.
Figure 4:
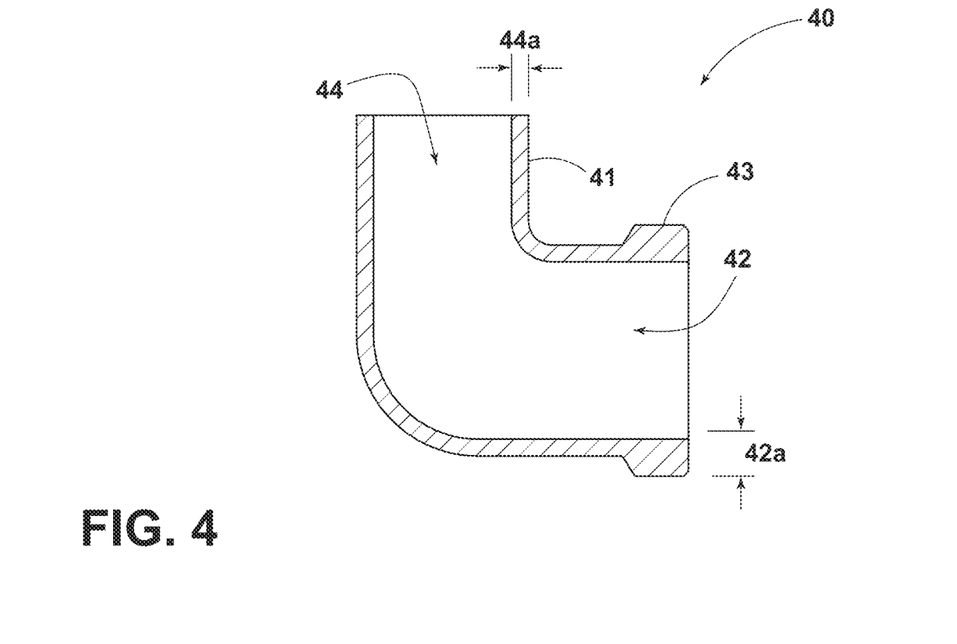
FIG. 4 is a side, cross-sectional view of the piping component of FIG. 3.

All of the features and components of the elbow fitting 40 including, but not limited to, the body 41 and the flange 43 may be fabricated from the disclosed low silicon copper alloys using multiple fabrication methods discussed above. The use of the disclosed low silicon copper alloys for fabricating the elbow fitting 40 gives the elbow fitting 40 the capability to be used with one or multiple joinery methods and in one or multiple service applications, as previously discussed.

Figure 5:
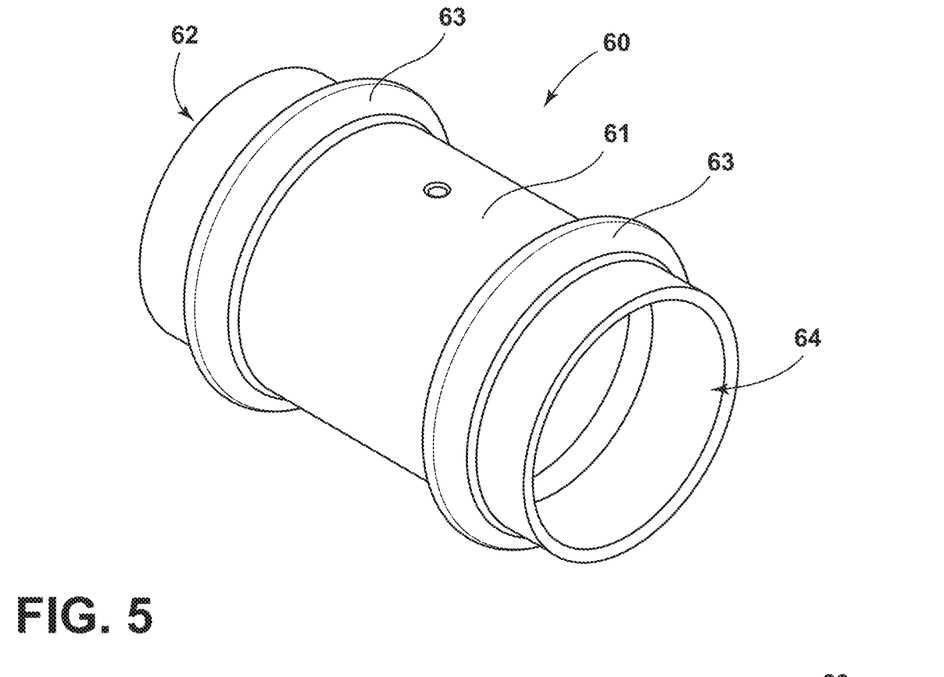
FIG. 5 is a perspective view of a piping component according to various examples.
Figure 6:
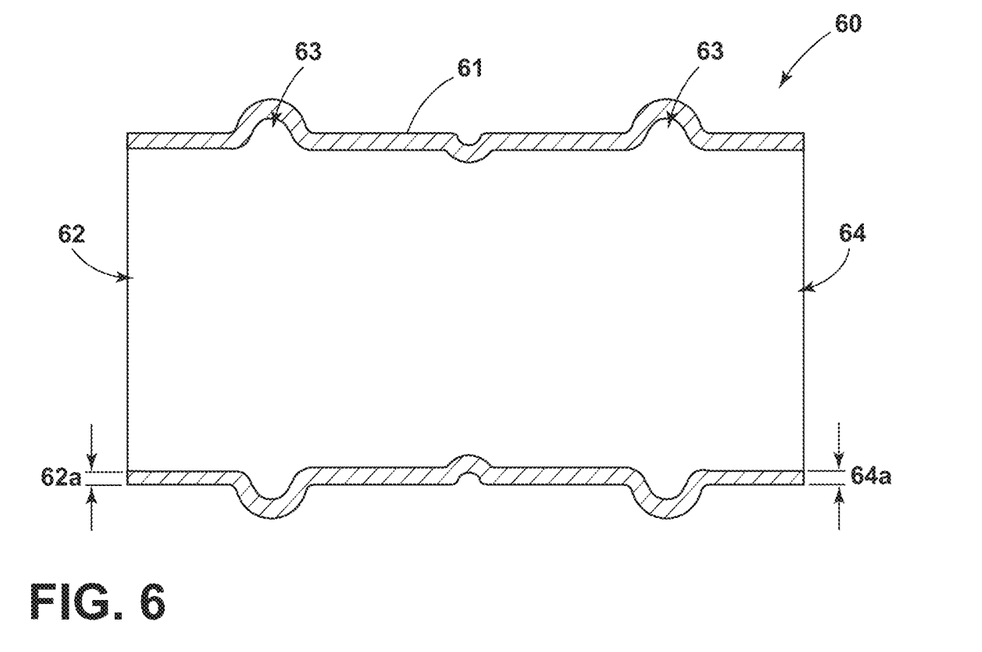
FIG. 6 is a side, cross-sectional view of the piping component of FIG. 5.

Referring to FIGS. 5 and 6, other piping components, such as the depicted coupler 60, may also be fabricated from the disclosed low silicon copper alloys according to further aspects of the disclosure. As depicted, the coupler 60 may include standard features of a coupler 60 including, but not limited to, a piping body 61, an inlet end 62, a sealing recesses 63 and an outlet end 64. According to various examples, a seal (not shown) may be positioned within one or more of the sealing recesses 63. These features are conventionally arranged within the coupler 60 and generally function as known in the field. For example, the inlet end 62 and the outlet end 64 of the piping body 61 allow the press fitting 60 to control the flow of fluid from the inlet end 62 to the outlet end 64. Further, the wall thickness 62*a* (at the inlet end 62) and the wall thickness 64*a* (at the outlet end 64) of the piping body 61 may be modified during fabrication, and further the ends 62, 64 may include tapered ends, grooves, stops, or other features to further facilitate use of the coupler 60 with one or multiple joinery methods. In various examples, the inlet end 62 and the outlet end 64 may include threading for joinery methods. In other examples, the inlet end 62 and the outlet end 64 may be unthreaded. In still other examples, the inlet end 62 and the outlet end 64 may have teeth or barbs positioned to facilitate gripping of a pipe when the pipe is received by the coupler 60.

All of the features and components of the coupler 60 including, but not limited to, the piping body 61, inlet end 62, sealing recesses 63 and outlet end 64 may be fabricated from the disclosed low silicon copper alloys using multiple fabrication methods discussed above. The use of the disclosed low silicon copper alloys for fabricating the coupler 60 gives the coupler 60 the capability to be used with one or multiple joinery methods and in one or multiple service applications, as previously discussed.

It should be understood that the valve assembly 10, the elbow fitting 40, and the coupler 60, aspects of the disclosure depicted in FIGS. 1-6 are merely exemplary. Other piping components may be fabricated from the disclosed low silicon copper alloys using one or multiple fabrication methods as discussed above to allow the piping components to be joined using one or multiple of the joinery methods and used in one or multiple service applications, as previously discussed in relation to the ball valve assembly 10, elbow fitting 40, and coupler 60. For example, piping components with at least one open end that are designed to be joined with a pipe, such as connection ends, construction bodies, flow control members, and/or article accessories may be fabricated using the disclosed low silicon copper alloys. Furthermore, it will be understood that piping components that are made as a single piece or constructed with a number of parts may be fabricated using the disclosed low silicon copper alloys.

EXAMPLES

Examples of disclosed low silicon copper alloys as detailed in Table 1 above are discussed below as Examples 1-8, further denoted as "Ex. 1", "Ex. 2", etc. Each of these Examples 1-8 is discussed in comparison to known alloys (e.g., C 12200, C 87500, C 87600, and C 87850), further denoted as "C.E. 1", "C.E. 2", "C.E. 3", and "C.E. 4". These known alloys are highlighted as comparative alloys in the sense that they are used for fabricating piping components with a specific fabrication method, a specific joinery method, and/or a specific service application. In contrast, the alloys of the disclosure (Examples 1-8) can be employed to enable multiple piping component fabrication methods, multiple joinery methods, and/or multiple service applications.

The specific compositions of Examples 1-8 are listed in Table 2 below and are consistent with the composition shown in Table 1. In Table 2, where there is no value entered for the content of an element as indicated by "-", the indicated element was not measured for the example composition. Further, where the value for the content of an element is indicated by "T", less than 0.008% by weight, or only trace amounts, of the element was found for the example composition. It will be understood that these Examples 1-8 are exemplary of the low silicon copper alloys of the disclosure.

TABLE 2

| | Ex. 1 | Ex. 2 | Ex. 3 | Ex. 4 | Ex. 5 | Ex. 6 | Ex. 7 | Ex. 8 | C.E. 1 | C.E. 2 | C.E. 3 | C.E. 4 |
|---|---|---|---|---|---|---|---|---|---|---|---|---|
| Cu | 83.34 | 84.26 | 83.88 | 84.5 | 85.26 | 85.49 | 84.18 | 85.87 | 99.9 min | 79.0 min | 88.0 min | 74-78 |
| Zn | 15.55 | 15.07 | 15.06 | 14.26 | 13.88 | 12.62 | 15.15 | 12.67 | — | 12-16 | 4-7 | remainder |
| Si | 1.020 | 0.517 | 0.888 | 1.050 | 0.749 | 1.620 | 0.465 | 1.270 | — | 3-5 | 3.5-5.5 | 2.7-3.4 |
| P | 0.026 | T | T | 0.087 | T | T | — | — | — | — | — | 0.05-0.20 |
| Fe | 0.028 | 0.15 | 0.147 | 0.019 | 0.054 | 0.183 | 0.172 | 0.141 | — | — | 0.20 max | 0.10 max |
| As | — | T | T | T | T | T | T | — | — | — | — | — |
| Sb | — | T | T | T | T | T | T | — | — | — | — | — |
| Pb | 0.008 | T | T | T | 0.010 | 0.011 | T | — | — | 0.09 max | 0.09 max | 0.09 max |
| Al | — | T | T | T | T | T | T | — | — | — | — | — |
| Sn | 0.010 | T | T | T | 0.020 | 0.019 | T | — | — | — | — | 0.30 max |
| Mn | — | T | T | T | T | T | T | — | — | — | — | — |
| Ni | — | T | T | T | T | T | T | — | — | — | — | — |

Example 1

One example of a low silicon copper alloy (Ex. 1) includes about 83% copper, about 16% zinc, about 1% silicon, about 0.03% phosphorous, about 0.03% iron, about 0.01% tin, and about 0.01% lead (by weight). A tensile testing method detailed in the American Society for Testing and Materials (ASTM) E8 Standard Test Methods for Tension of Metallic Materials was used for four test specimens fabricated from the disclosed composition. The test specimens were each a cast 0.505 tensile bar, as required by the standard. The results of the testing are detailed below in Table 3. The tensile test results are comparable to known values for the mechanical properties as provided by the Copper Development Association (CDA) for various forms and tempers of C 12200 alloys, which are also listed in Table 3.

TABLE 3

| Sample ID | Sample Desc. | Ultimate Tensile Strength (N/mm$^2$) | Yield Strength (N/mm$^2$) | Elongation (%) |
|---|---|---|---|---|
| Ex. 1 | Pour 1 - Sample 1 | 287 | 96 | 37.9 |
| Ex. 1 | Pour 1 - Sample 2 | 290 | 112 | 45.6 |
| Ex. 1 | Pour 2 - Sample 1 | 268 | 111 | 33.0 |
| Ex. 1 | Pour 2 - Sample 2 | 245 | 111 | 25.4 |
|  | Average | 273 | 108 | 35.5 |
| C 12200 | Hard Drawn | 379 | 345 | 8.0 |
| C 12200 | Light Drawn | 276 | 221 | 25.0 |
| C 12200 | Soft Grain 0.025 mm | 234 | 76 | 45.0 |
| C 12200 | Soft Grain 0.050 mm | 221 | 69 | 45.0 |

As denoted in Table 2, C 12200 alloys include a minimum of 99.9% copper by weight, while the Ex. 1 composition maintains about 83% copper by weight. Further, C 12200 alloys do not include zinc, silicon, or any of the other elements included in the disclosed composition. The mechanical properties provided by the high copper content of C 12200 alloys make these alloys the ideal alloys for fabricating piping components for use with press connections. Particularly, light drawn piping components and soft grain piping components are currently preferred for these press connections based on their ideal mechanical properties while copper tubing to be received by press fittings may be formed of hard drawn C 12200 alloys.

As detailed in Table 3 above, the mechanical properties exhibited by the test specimens of Ex. 1 are comparable to the mechanical properties of the ideal C 12200 alloys for press fittings. Particularly, the average yield strength exhibited by the test specimens of Ex. 1 (about 108 N/mm$^2$) is comparable to the yield strength exhibited by C 12200 alloys (between 69 N/mm$^2$ and 221 N/mm$^2$) as reported by the CDA. The average ultimate tensile strength of the test specimens of Ex. 1 (about 273 N/mm$^2$) is also comparable to the ultimate tensile strength of C 12200 alloys (between 221 N/mm$^2$ and 276 N/mm$^2$), and the average ductility of the test specimens of Ex. 1, as measured in percent elongation (about 35.5%), is favorably high and comparable to the ductility of C 12200 alloys (between about 25.0% and 45.0%). Thus, Ex. 1 exhibited mechanical properties within the range of ideal mechanical properties for piping components to be used for mechanical deformation joinery processes like press connections as evidenced by the comparison between the ideal mechanical properties of the currently preferred C 12200 alloys and the mechanical properties exhibited by the test specimens of Ex. 1.

Example 2

Another exemplary composition of the disclosed low silicon copper alloys (Ex. 2) includes about 84% copper, about 15% zinc, about 0.5% silicon, about 0.15% iron, and less than about 0.008% of one or more of phosphorus, arsenic, antimony, lead, aluminum, tin, manganese, and nickel (by weight). Like with Ex. 1, a tensile testing method detailed in the ASTM E8 Standard Test Methods for Tension of Metallic Materials was used for multiple specimens fabricated from Ex. 2. The test specimens were each a cast 0.505 tensile bar, as required by the standard. The average values of the tensile test results are detailed below in Table 4. The average values of the tensile test results are comparable to known values for the mechanical properties as provided by the CDA for various forms and tempers of C 12200 alloys, which are also listed in Table 4.

TABLE 4

| Sample ID | Sample Desc. | Ultimate Tensile Strength (N/mm$^2$) | Yield Strength (N/mm$^2$) | Elongation (%) |
|---|---|---|---|---|
| Ex. 2 | — | 278.3 | 84.3 | 57.0 |
| C 12200 | Hard Drawn | 379.0 | 345.0 | 8.0 |
| C 12200 | Light Drawn | 276.0 | 221.0 | 25.0 |
| C 12200 | Soft Grain 0.025 mm | 234.0 | 76.0 | 45.0 |
| C 12200 | Soft Grain 0.050 mm | 221.0 | 69.0 | 45.0 |

As detailed in Table 4 above, like the test specimens of Ex. 1, the test specimens of Ex. 2 exhibited mechanical properties that are comparable to the mechanical properties exhibited by the ideal C 12200 alloys for press fittings, as discussed above. Particularly, the average yield strength of the test specimens of Ex. 2 (about 84 N/mm$^2$) is comparable to the yield strength of C 12200 alloys (between 69 N/mm$^2$ and 221 N/mm$^2$). The average ultimate tensile strength of the test specimens of Ex. 2 (about 278 N/mm$^2$) is also comparable to the ultimate tensile strength of C 12200 alloys (between 221 N/mm$^2$ and 276 N/mm$^2$), and the average ductility of the test specimens of Ex. 2, as measured in percent elongation, (about 57.0%) is favorably high compared to the ductility exhibited by C 12200 alloys (between about 25.0% and 45.0%). Thus, like the test specimens of Ex. 1, the test specimens of Ex. 2 exhibit mechanical properties within the range of ideal mechanical properties for piping components to be used for mechanical deformation joinery processes like press connections as evidenced by the comparison between the ideal mechanical properties of the currently preferred C 12200 alloys and the mechanical properties exhibited by the test specimens of Ex. 2. Additionally, the range of values for tensile strength between the test specimens of Ex. 1 and the test specimens of Ex. 2 is between about 83 N/mm$^2$ and about 112 N/mm$^2$, indicating that exemplary compositions of the disclosed alloys exhibit a smaller range of yield strengths, ensuring more narrow and predictable strengths than those exhibited by various forms of C 12200 alloys. This increases the suitability of the disclosed alloys for use in at least press fittings.

A dezincification (DZ) corrosion test was also performed on a specimen of Ex. 2 in conjunction with specimens having sample compositions according to C 87500 alloys and C 87600 alloys and a specimen of an alloy ("Moderate Silicon") having a composition including a silicon content less than the content of C 87500 and C 87600 but greater than the silicon content of the disclosed alloys. C 87500 and C 87600 are high silicon alloys often used for fabricating piping components as the high silicon content of these alloys (3% to 5% by weight and 3.5% and 5.5% by weight, respectively, as provided by the CDA) inhibits corrosion. However, the high silicon contents of C 87500 and C 87600 also results in higher mechanical strengths that may impede use of the high-silicon alloys with deformation joinery methods like press fitting.

The compositions of the tested specimens are laid out below in Table 5. It should be noted that the trace elements of Ex. 2, as detailed in Table 2, such as phosphorous, arsenic, antimony, lad, aluminum, tin, manganese, and nickel, were not included in Table 5 below for clarity. The test was conducted in accordance with ISO 6509 testing method. Results for the testing of the specimens are also provided in Table 5.

TABLE 5

| | Alloy Composition (% by weight) | | | |
|---|---|---|---|---|
| Element | C 87500 | C 87600 | Moderate Silicon | Ex. 2 |
| Cu | 81.22 | 88.45 | 80.75 | 84.26 |
| Zn | 15.07 | 6.49 | 16.13 | 15.07 |
| Si | 3.560 | 4.870 | 2.890 | 0.517 |
| Fe | 0.047 | 0.165 | 0.146 | 0.150 |
| DZ Corrosion Penetration (μm) | 92 | 0 | 37 | 41 |

Acceptance criteria for the DZ corrosion penetration depth under the ISO 6509 testing method is less than 200 μm. As detailed in Table 5, the specimen of Ex. 2 yielded a DZ corrosion penetration depth of about 41 μm while the specimen of the C 87500 and C 87600 alloys yielded a DZ corrosion penetration depth of 92 μm and 0 μm, respectively. The specimen of the Moderate Silicon alloy yielded a DZ corrosion penetration depth of 37 μm. Though the silicon content of Ex. 2 is significantly lower than the silicon contents of the C 87500 and C 87600 compositions, there was not a substantial increase in the corrosion penetration depth between the specimens of the high silicon alloys and the specimen of Ex. 2. Further, there was not a substantial increase in the corrosion penetration depth of the specimen of Ex. 2 as compared to the Moderate Silicon alloy. These results indicate that the lower silicon content of Ex. 2, as compared to the high-silicon alloys C 87500 and C 87600 and the Moderate Silicon alloy, does not negatively affect the ability of Ex. 2 to maintain the a resistance to dezincification that is comparable to the currently preferred alloys having high silicon contents.

Example 3

Another exemplary composition of the disclosed low silicon copper alloys (Ex. 3) includes about 84% copper, about 14% zinc, about 0.9% silicon, about 0.15% iron, and less than about 0.008% of one or more of phosphorus, arsenic, antimony, lead, aluminum, tin, manganese, and nickel (by weight). Like with Ex. 1 and Ex. 2, a tensile testing method detailed in the ASTM E8 Standard Test Methods for Tension of Metallic Materials was used for multiple specimens fabricated from Ex. 3. The test specimens were each a cast 0.505 tensile bar, as required by the standard. The average values of the tensile test results are detailed below in Table 6. The average values of the tensile test results are comparable to known values for the mechanical properties as provided by the CDA for various forms and tempers of C 12200 alloys, which are also listed in Table 6.

TABLE 6

| Sample ID | Sample Desc. | Ultimate Tensile Strength (N/mm²) | Yield Strength (N/mm²) | Elongation (%) |
|---|---|---|---|---|
| Ex. 3 | — | 275.5 | 83.8 | 57.0 |
| C 12200 | Hard Drawn | 379.0 | 345.0 | 8.0 |
| C 12200 | Light Drawn | 276.0 | 221.0 | 25.0 |

TABLE 6-continued

| Sample ID | Sample Desc. | Ultimate Tensile Strength (N/mm²) | Yield Strength (N/mm²) | Elongation (%) |
|---|---|---|---|---|
| C 12200 | Soft Grain 0.025 mm | 234.0 | 76.0 | 45.0 |
| C 12200 | Soft Grain 0.050 mm | 221.0 | 69.0 | 45.0 |

As detailed in Table 6 above, like the test specimens of Ex. 1 and Ex. 2, the test specimens of Ex. 3 exhibited mechanical properties that are comparable to the mechanical properties of the ideal C 12200 alloys for press fittings, as discussed above. Particularly, the average yield strength of the test specimens of Ex. 3 (about 84 N/mm²) is comparable to the yield strength of C 12200 alloys (between 69 N/mm² and 221 N/mm²). The average ultimate tensile strength of the test specimens of Ex. 3 (about 276 N/mm²) is also comparable to the ultimate tensile strength of C 12200 alloys (between 221 N/mm² and 276 N/mm²), and the average ductility of the test specimens of Ex. 3, as measured in percent elongation, (about 57%) is favorably high compare to the ductility of C 12200 alloys (between about 25.0% and 45%). Thus, like the test specimens of Ex. 1 and Ex. 2, the test specimens of Ex. 3 exhibited mechanical properties within the range of ideal mechanical properties for piping components to be used for mechanical deformation joinery processes like press connections as evidenced by the comparison between the ideal mechanical properties of the currently preferred C 12200 alloys and the mechanical properties exhibited by the test specimens of Ex. 3. Additionally, the average yield strength of the test specimens of Ex. 3 remains within the previously discussed range of values (i.e., 83 N/mm² to 112 N/mm²), further indicating that exemplary compositions of the disclosed alloys yield more narrow and predictable ranges of yield strength as compared to C 12200 alloys. This increases the suitability of the disclosed alloys in at least press fittings.

Example 4

Another exemplary composition of the disclosed low silicon copper alloys (Ex. 4) includes about 85% copper, about 14% zinc, about 1.1% silicon, about 0.09% phosphorous, about 0.02% iron, and less than about 0.008% of one or more of arsenic, antimony, lead, aluminum, tin, manganese, and nickel (by weight). Like with Ex. 1, Ex. 2, and Ex. 3, a tensile testing method detailed in the ASTM E8 Standard Test Methods for Tension of Metallic Materials was used for multiple specimens fabricated from Ex. 4. The test specimens were each a cast 0.505 tensile bar, as required by the standard. The average values of the tensile test results are detailed below in Table 7. The average values of the tensile test results are comparable to known values for the mechanical properties as provided by the CDA for various forms and tempers of C 12200 alloys, which are also listed in Table 7.

TABLE 7

| Sample ID | Sample Desc. | Ultimate Tensile Strength (N/mm²) | Yield Strength (N/mm²) | Elongation (%) |
|---|---|---|---|---|
| Ex. 4 | — | 272.3 | 107.3 | 35.5 |
| C 12200 | Hard Drawn | 379.0 | 345.0 | 8.0 |
| C 12200 | Light Drawn | 276.0 | 221.0 | 25.0 |
| C 12200 | Soft Grain 0.025 mm | 234.0 | 76.0 | 45.0 |
| C 12200 | Soft Grain 0.050 mm | 221.0 | 69.0 | 45.0 |

As detailed in Table 7 above, like the test specimens of Ex. 1, Ex. 2, and Ex. 3, the test specimens of Ex. 4 exhibited mechanical properties that are comparable to the mechanical properties of the ideal C 12200 alloys for press fittings, as discussed above. Particularly, the average yield strength of the test specimens of Ex. 4 (about 84 N/mm$^2$) is comparable to the yield strength of C 12200 alloys (between 69 N/mm$^2$ and 221 N/mm$^2$). The average ultimate tensile strength of the test specimens of Ex. 4 (about 276 N/mm$^2$) is also comparable to the ultimate tensile strength of C 12200 alloys (between 221 N/mm$^2$ and 276 N/mm$^2$), and the average ductility of the test specimens of Ex. 4, as measured in percent elongation, (about 35.5%) is favorably high and comparable to the ductility of C 12200 alloys (between about 25.0% and 45%). Thus, like the test specimens of Ex. 1, Ex. 2, and Ex. 3, the test specimens of Ex. 4 exhibited mechanical properties within the range of ideal mechanical properties for piping components to be used for mechanical deformation joinery processes like press connections as evidenced by the comparison between the ideal mechanical properties of the currently preferred C 12200 alloys and the mechanical properties exhibited by the test specimens of Ex. 4. Additionally, the average yield strength of the test specimens of Ex. 4 remains within the previously discussed range of values (i.e., 83 N/mm$^2$ to 112 N/mm$^2$), further indicating that exemplary compositions of the disclosed alloys yield more narrow and predictable ranges of yield strength as compared to C 12200 alloys, increasing the suitability of the disclosed alloys in at least press fittings.

Example 5

Another exemplary composition of the disclosed low silicon copper alloys (Ex. 5) includes about 85% copper, about 14% zinc, about 0.7% silicon, about 0.05% iron, about 0.01% lead, about 0.02 tin, and less than about 0.008% of one or more of phosphorus, arsenic, antimony, aluminum, manganese, and nickel (by weight). Like with Ex. 1, Ex. 2, Ex. 3, and Ex. 4, a tensile testing method detailed in the ASTM E8 Standard Test Methods for Tension of Metallic Materials was used for multiple specimens fabricated from Ex. 5. The test specimens were each a cast 0.505 tensile bar, as required by the standard. The average values of the tensile test results are detailed below in Table 8. The average values of the tensile test results are comparable to known values for the mechanical properties as provided by the CDA for various forms and tempers of C 12200 alloys, which are also listed in Table 8.

TABLE 8

| Sample ID | Sample Desc. | Ultimate Tensile Strength (N/mm$^2$) | Yield Strength (N/mm$^2$) | Elongation (%) |
|---|---|---|---|---|
| Ex. 5 | — | 288.5 | 104.0 | 42.0 |
| C 12200 | Hard Drawn | 379.0 | 345.0 | 8.0 |
| C 12200 | Light Drawn | 276.0 | 221.0 | 25.0 |
| C 12200 | Soft Grain 0.025 mm | 234.0 | 76.0 | 45.0 |
| C 12200 | Soft Grain 0.050 mm | 221.0 | 69.0 | 45.0 |

As detailed in Table 8 above, like the test specimens of Ex. 1, Ex. 2, Ex. 3, and Ex. 4, the test specimens of Ex. 5 exhibited mechanical properties that are comparable to the mechanical properties of the ideal C 12200 alloys for press fittings, as discussed above. Particularly, the average yield strength of the test specimens of Ex. 5 (about 104 N/mm$^2$) is comparable to the yield strength of C 12200 alloys (between 69 N/mm$^2$ and 221 N/mm$^2$). The average ultimate tensile strength of the test specimens of Ex. 5 (about 289 N/mm$^2$) is also comparable to the ultimate tensile strength of C 12200 alloys (between 221 N/mm$^2$ and 276 N/mm$^2$), and the average ductility of the test specimens of Ex. 5, as measured in percent elongation, (about 42%) is favorably high and comparable to the ductility of C 12200 alloys (between about 25.0% and 45%). Thus, like the test specimens of Ex. 1, Ex. 2, Ex. 3, and Ex. 4, the test specimens of Ex. 5 exhibited mechanical properties within the range of ideal mechanical properties for piping components to be used for mechanical deformation joinery processes like press connections as evidenced by the comparison between the ideal mechanical properties of the currently preferred C 12200 alloys and the mechanical properties of the test specimens of Ex. 5. Additionally, the average yield strength of the test specimens of Ex. 5 remains within the previously discussed range of values (i.e., 83 N/mm$^2$ to 112 N/mm$^2$), further indicating that exemplary compositions of the disclosed alloys yield more narrow and predictable ranges of yield strength as compared to C 12200 alloys, increasing the suitability of the disclosed alloys in at least press fittings.

A thermal conductivity evaluation was also conducted on a sample made from Ex. 5 in conjunction with the testing of samples made of exemplary C 87500 and C 87600 alloys. The samples were evaluated using a C-Therm TCi Thermal Conductivity analyzer. More particularly, three specimens were tested using a Modified Transient Plane Source sensor with the C-Therm Tci Thermal Conductivity Analyzer in accordance with ASTM D7984-16 testing method. Table 9 below lists the known average thermal conductivity of high silicon alloys C 87500, C 87600, and C 87850, as provided by the CDA, as well as the results of testing samples of the exemplary C 87500 and C 87600 alloys with a resulting average. Table 9 further lists the results of the testing performed on specimens of Ex. 5 with a resulting average.

TABLE 9

| Thermal Conductivity, k (W/m · K) | | | | | |
|---|---|---|---|---|---|
| C 87500 CDA | C 87600 CDA | C 87850 CDA | C 87500 Tested | C 87500 Tested | Ex. 5 |
| Test 1 | N/A | N/A | N/A | 24.9 | 30.2 | 34.5 |
| Test 2 | N/A | N/A | N/A | 25.1 | 30.2 | 34.8 |
| Test 3 | N/A | N/A | N/A | 25.0 | 30.0 | 34.7 |
| Average | 27.69 | 28.38 | 37.73 | 25.0 | 30.1 | 34.6 |

The high silicon alloys (e.g., C 87500, C 87600, and C 87850) are commonly used for brazing and soldering due to the high thermal conductivity of the high silicon alloys. As compared to the high silicon alloys, both as reported by the CDA and as tested with the test specimens of Ex. 5, the test specimens of Ex. 5 demonstrated an increase in overall average thermal conductivity (k) value over all three high silicon alloys. This high thermal conductivity (k) value of about 35 W/m·K presents Ex. 5 as a better or equally good option for fabricating piping components (e.g., the valve assembly 10, the elbow fitting 40, and/or the coupler 60) for use with soldering as compared to the commonly soldered high silicon alloys. Further, as described above, tensile testing of the test specimens of Ex. 5 indicates that the same alloy (Ex. 5) exhibited the necessary ductility and mechanical strengths to be used to fabricate press fittings. This indicates further that the disclosed alloys are suitable for multiple fabrication methods for forming piping components that may be used with multiple joinery methods and/or service applications.

Example 6

Another exemplary composition of the disclosed low silicon copper alloy (Ex. 6) includes about 85% copper, about 13% zinc, about 1.05% silicon, about 0.18% iron, about 0.01% lead, about 0.02 tin, and less than about 0.008% of one or more of phosphorus, arsenic, antimony, aluminum, manganese, and nickel (by weight). Like with Ex. 1, Ex. 2, Ex. 3, Ex. 4, and Ex. 5, a tensile testing method detailed in the ASTM E8 Standard Test Methods for Tension of Metallic Materials was used for multiple specimens fabricated from Ex. 6. The test specimens were each a cast 0.505 tensile bar, as required by the standard. The average values of the tensile test results are detailed below in Table 10. The average values of the tensile test results are comparable to known values for the mechanical properties as provided by the CDA for various forms and tempers of C 12200 alloys, which are also listed in Table 10.

TABLE 10

| Sample ID | Sample Desc. | Ultimate Tensile Strength (N/mm$^2$) | Yield Strength (N/mm$^2$) | Elongation (%) |
|---|---|---|---|---|
| Ex. 6 | — | 338.7 | 89.8 | 65.3 |
| C 12200 | Hard Drawn | 379.0 | 345.0 | 8.0 |
| C 12200 | Light Drawn | 276.0 | 221.0 | 25.0 |
| C 12200 | Soft Grain 0.025 mm | 234.0 | 76.0 | 45.0 |
| C 12200 | Soft Grain 0.050 mm | 221.0 | 69.0 | 45.0 |

As detailed in Table 10 above, like the test specimens of Ex. 1, Ex. 2, Ex. 3, Ex. 4, and Ex. 5, the test specimens of Ex. 6 exhibited mechanical properties that are comparable to the mechanical properties of the ideal C 12200 alloys for press fittings, as discussed above. Particularly, the average yield strength of the test specimens of Ex. 6 (about 90 N/mm$^2$) is comparable to the yield strength of C 12200 alloys (between 69 N/mm$^2$ and 221 N/mm$^2$). The average ultimate tensile strength of the test specimens of Ex. 6 (about 339 N/mm$^2$) is higher than the ultimate tensile strength of C 12200 alloys (between 221 N/mm$^2$ and 276 N/mm$^2$), and the average ductility of the test specimens of Ex. 6, as measured in percent elongation, (about 65%) is favorably high compared to the ductility of C 12200 alloys (between about 25.0% and 45%). Thus, like the test specimens of Ex. 1, Ex. 2, Ex. 3, Ex. 4, and Ex. 5, the test specimens of Ex. 6 exhibited mechanical properties within the range of ideal mechanical properties for piping components to be used for mechanical deformation joinery processes, like press connections, as evidenced by the comparison between the ideal mechanical properties of the currently preferred C 12200 alloys and the mechanical properties exhibited by the test specimens of Ex. 6. Additionally, the average yield strength of the test specimens of Ex. 6 remained within the previously discussed range of values (i.e., 83 N/mm$^2$ to 112 N/mm$^2$), further indicating that exemplary compositions of the disclosed alloys yield more narrow and predictable ranges of yield strength as compared to the broader range of yield strengths exhibited by C 12200 alloys, increasing the suitability of the disclosed alloys in at least press fittings.

Like with Ex. 5, a thermal conductivity evaluation was also conducted on samples made from Ex. 6. Specifically, a specimen was tested using a Modified Transient Plane Source sensor with the C-Therm TCi Thermal Conductivity Analyzer in accordance with ASTM D7984-16 testing method.

Table 11 below lists the known average thermal conductivity of high silicon alloys C 87500, C 87600, and C 87850 as provided by the CDA. Table 11 also lists the results of testing samples of the exemplary C 87500 and C 87600 alloys tested in conjunction with the test specimens of Ex. 5, as discussed above, and further lists a resulting average of the results. Table 11 further lists the results of the testing performed on the test specimen of Ex. 6 with a resulting average.

TABLE 11

| | Thermal Conductivity, k (W/m · K) | | | | | |
|---|---|---|---|---|---|---|
| Element | C 87500 CDA | C 87600 CDA | C 87850 CDA | C 87500 Tested | C 87500 Tested | Ex. 6 |
| Test 1 | N/A | N/A | N/A | 24.9 | 30.2 | 50.5 |
| Test 2 | N/A | N/A | N/A | 25.1 | 30.2 | 51.6 |
| Test 3 | N/A | N/A | N/A | 25.0 | 30.0 | 50.6 |
| Average | 27.69 | 28.38 | 37.73 | 25.0 | 30.1 | 50.9 |

As discussed previously, the high silicon alloys (e.g., C 87500, C 87600, and C 87850) are commonly used for brazing and soldering due to the high thermal conductivity of the high silicon alloys. As compared to the high silicon alloys, both as reported by the CDA and with the test specimens of Ex. 5, the test specimens of Ex. 6 demonstrated an increase in overall average thermal conductivity (k) value over all three high silicon alloys. This higher thermal conductivity (k) value of about 51 W/m·K presents Ex. 6 as a better option for fabricating piping components (e.g., the valve assembly 10, the elbow fitting 40, and/or the coupler 60) for use with soldering as compared to the commonly soldered high silicon alloys. It is further notable that Ex. 6 includes a silicon content (1.62% by weight) on the higher end of the specified range for silicon content (i.e., 0.5% to 2.0% by weight) for the disclosed alloys. With this silicon content, the test specimens of Ex. 6 exhibited an average thermal conductivity (k) value that is notably higher than the thermal conductivity (k) values of the high silicon alloys, both provided by the CDA and tested, while still maintaining the necessary ductility and mechanical strengths to be used to fabricate press fittings. This indicates further that the disclosed alloys are suitable for multiple fabrication methods for forming piping components that may be used with multiple joinery methods and/or service applications.

Example 7

Another exemplary composition of the disclosed low silicon copper alloy (Ex. 7) includes about 84% copper, about 15% zinc, about 0.5% silicon, about 0.5% iron, about 0.1% lead, and less than about 0.008% of one or more of phosphorus, arsenic, antimony, aluminum, tin, manganese, and nickel (by weight). Like Examples 5 and 6, a thermal conductivity evaluation was also conducted on samples made from the composition of Example 7 using a Modified Transient Plane Source sensor with the C-Therm TCi Thermal Conductivity Analyzer in accordance with ASTM D7984-16 testing method.

Table 12 below lists the known average thermal conductivity of high silicon alloys C 87500, C 87600, and C 87850 as provided by the CDA. Table 12 also lists the results of testing samples of the exemplary C 87500 and C 87600 alloys tested in conjunction with the test specimens of Ex. 5, as discussed above, and further lists a resulting average of the results. Table 12 further lists the results of the testing performed on the test specimen of Ex. 7 with a resulting average.

TABLE 12

Thermal Conductivity, k (W/m · K)

| Element | C 87500 CDA | C 87600 CDA | C 87850 CDA | C 87500 Tested | C 87500 Tested | Ex. 7 |
|---|---|---|---|---|---|---|
| Test 1 | N/A | N/A | N/A | 24.9 | 30.2 | 66.4 |
| Test 2 | N/A | N/A | N/A | 25.1 | 30.2 | 66.9 |
| Test 3 | N/A | N/A | N/A | 25.0 | 30.0 | 66.5 |
| Average | 27.69 | 28.38 | 37.73 | 25.0 | 30.1 | 66.6 |

As discussed previously, the high silicon alloys (e.g., C 87500, C 87600, and C 87850) are commonly used for brazing and soldering due to the high thermal conductivity of the high silicon alloys. The test specimens of Ex. 7, like those of Ex. 5 and Ex. 6, demonstrated an increase in overall average thermal conductivity (k) value over all three high silicon alloys, both compared to the values provided by the CDA and compared to the values recorded during testing in conjunction with the test specimens of Ex. 5. This high thermal conductivity (k) value of about 67 W/m·K presents Ex. 7 as a better option for fabricating piping components (e.g., the valve assembly 10, the elbow fitting 40, and/or the coupler 60) for use with soldering as compared to the commonly soldered high silicon alloys.

Example 8

Another exemplary composition of the disclosed low silicon copper alloys (Ex. 8) includes about 86% copper, about 13% zinc, about 1.3% silicon, and about 0.14% iron. Trace elements of one or more of phosphorus, arsenic, antimony, aluminum, tin, manganese, and nickel may also be included. Like with Ex. 2, a dezincification (DZ) corrosion test was performed on a specimen of Ex. 8 in conjunction with the testing of the specimens having sample compositions according to C 87500 alloys and C 87600 alloys and a specimen of an alloy ("Moderate Silicon") having a composition including a silicon content less than the content of C 87500 and C 87600 but greater than the silicon content of the disclosed alloys. As discussed with respect to Ex. 2, C 87500 and C 87600 are high silicon alloys often used for fabricating piping components as the high silicon content of these alloys (3% to 5% by weight and 3.5% and 5.5% by weight, respectively, as provided by the CDA) inhibits corrosion. However, the high silicon contents of C 87500 and C 87600 alloys also results in higher mechanical strengths that may impede use of the high-silicon alloys with deformation joinery methods like press fitting.

The compositions of the tested specimens are laid out below in Table 13. It should be noted that the trace elements of Ex. 9, as detailed in Table 2, such as phosphorus, arsenic, antimony, lead, aluminum, tin, manganese, and nickel, were not included in Table 13 below for clarity. The test was conducted in accordance with ISO 6509 testing method. Results for the testing of the specimens are also provided in Table 13.

TABLE 13

Alloy Composition (% by weight)

| Element | C 87500 | C 87600 | Moderate Silicon | Example 8 |
|---|---|---|---|---|
| Cu | 81.22 | 88.45 | 80.75 | 85.87 |
| Zn | 15.07 | 6.49 | 16.13 | 12.67 |
| Si | 3.560 | 4.870 | 2.890 | 1.270 |
| Fe | 0.047 | 0.165 | 0.146 | 0.141 |
| DZ Corrosion Penetration (μm) | 92 | 0 | 37 | 53 |

Acceptance criteria for the DZ corrosion penetration depth under the ISO 6509 testing method is less than 200 μm. As detailed in Table 13, the specimen of Ex. 8 yielded a DZ corrosion penetration depth of about 53 μm while the C 87500 and C 87600 alloys yielded a DZ corrosion penetration depth of 92 μm and 0 μm, respectively. The Moderate Silicon alloy yielded a DZ corrosion penetration depth of 37 μm. Like with Ex. 2 above, though the silicon content of Ex. 8 is significantly lower than the silicon contents of the C 87500 and C 87600 alloys, there was not a substantial increase in the corrosion penetration depth between the tested specimens of the high silicon alloys and the tested specimen of Ex. 8. Further, there was not a substantial increase in the corrosion penetration depth of the tested specimen of Ex. 8 as compared to the tested specimen of the Moderate Silicon alloy. These results indicate that the lower silicon content of Ex. 8, as compared to the high-silicon alloys C 87500 and C 87600 and the Moderate Silicon alloy, does not negatively affect the ability of Ex. 8 to maintain the a resistance to dezincification that is comparable to the currently preferred alloys having high silicon contents.

According to a first aspect, a piping article includes a piping component having a piping body with an open end. The piping component is formed of an alloy comprising from about 12% to about 16% zinc, from about 0.5% to about 1.8% silicon, and a balance of copper (by weight). The alloy comprises an ultimate tensile strength of from about 200 N/mm$^2$ to about 300 N/mm$^2$, a yield strength of from about 75 N/mm$^2$ to about 225 N/mm$^2$, and an elongation of from about 15% to about 60%.

According to a second aspect, a piping article according to the first aspect is provided. The alloy further comprises from 0.05% to 0.2% iron (by weight).

According to a third aspect, a piping article according to the first aspect or the second aspect is provided. The alloy further comprises from 0.03% to 0.09% phosphorous (by weight).

According to a fourth aspect, a piping article according to any one of the first through third aspects is provided. The alloy further comprises from 0.03% to 0.09% arsenic (by weight).

According to a fifth aspect, a piping article according to any one of the first through fourth aspects is provided. The alloy further comprises from 0.03% to 0.09% antimony (by weight).

According to a sixth aspect, a piping article according to any one of the first through fifth aspects is provided. The alloy further comprises a minimum of 80% copper (by weight).

According to a seventh aspect, a piping article according to any one of the first through sixth aspects is provided. The alloy further comprises a maximum of 0.09% lead (by weight).

According to an eighth aspect, a piping article according to the first aspect is provided. The alloy comprises 82% to 84% copper, 14% to 16% zinc, 0.5% to 1% silicon, and trace amounts of phosphorous, iron, tin, and lead (by weight).

According to a ninth aspect, a piping article according to any one of the first through eighth aspects is provided. The alloy further comprises a thermal conductivity, k, of from about 30 W/m·K to about 70 W/m·K.

According to a tenth aspect, a piping article includes a piping component having a piping body with an open end. The piping component is formed of an alloy consisting essentially of from about 12% to about 16% zinc, from about 0.5% to about 1.8% silicon, and a balance of copper (by weight). The alloy comprises an ultimate tensile strength of about 300 N/mm$^2$ or less, a yield strength of about 225 N/mm$^2$ or less, and an elongation of about 60% or less.

According to an eleventh aspect, a piping article according to the tenth aspect is provided. The alloy consists essentially of from 80% to 85% copper, from 13% to 15% zinc, and from 0.5% to 1% silicon (by weight).

According to a twelfth aspect, a piping article according to the tenth aspect or the eleventh aspect is provided. The alloy comprises an ultimate tensile strength of from about 150 N/mm$^2$ to about 300 N/mm$^2$, a yield strength of from about 50 N/mm$^2$ to about 225 N/mm$^2$, and an elongation of from about 20% to about 55%.

According to a thirteenth aspect, a piping article according to any one of the tenth through twelfth aspects is provided. The alloy comprises an ultimate tensile strength of from about 200 N/mm$^2$ to about 300 N/mm$^2$, a yield strength of from about 75 N/mm$^2$ to about 225 N/mm$^2$, and an elongation of from about 25% to about 45%.

According to a fourteenth aspect, a piping article according to any one of the tenth through thirteenth aspects is provided. The alloy comprises an ultimate tensile strength of from about 240 N/mm$^2$ to about 280 N/mm$^2$, a yield strength of from about 90 N/mm$^2$ to about 110 N/mm$^2$, and an elongation of from about 30% to about 35%.

According to a fifteenth aspect, a piping article includes a piping component having a piping body with an open end. The piping component is formed of an alloy consisting essentially of from 12% to 16% zinc, from 0.5% to 2% silicon, one or more of (i) from 0.02% to 0.09% phosphorous, (ii) from 0.02% to 0.09% arsenic, (iii) from 0.02% to 0.09% antimony, and (iv) from 0.05% to 0.2% iron, and a balance of copper (by weight). The alloy comprises an ultimate tensile strength of about 300 N/mm$^2$ or less, a yield strength of about 225 N/mm$^2$ or less, and an elongation of about 60% or less.

According to a sixteenth aspect, a piping article according to the fifteenth aspect is provided. The alloy comprises an ultimate tensile strength of from about 200 N/mm$^2$ to about 300 N/mm$^2$, a yield strength of from about 75 N/mm$^2$ to about 225 N/mm$^2$, and an elongation of from about 20% to about 55%.

According to a seventeenth aspect, a piping article according to the fifteenth aspect or the sixteenth aspect is provided. The alloy consists essentially of from 82% to 88% copper, from 12% to 16% zinc, from 0.5% to 1% silicon, up to 0.2% iron, and up to 0.08% phosphorous (by weight).

According to an eighteenth aspect, a piping article according to the fifteenth aspect or the sixteenth aspect is provided. The alloy consists essentially of from 12% to 16% zinc, from 0.5% to 1.8% silicon, and of a minimum of 80% copper (by weight).

According to a nineteenth aspect, a piping article according to any one of the fifteenth through seventeenth aspects is provided. The alloy consists essentially of from 82% to 84% copper, from 14% to 16% zinc, and from 0.5% to 1% silicon (by weight).

According to a twentieth aspect, a piping article according to any one of the fifteenth through nineteenth aspects is provided. The alloy comprises a thermal conductivity, k, of about 30 W/m·K or greater.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents.

What is claimed is:

1. A piping article, comprising: a piping component comprising a piping body with an open end, wherein the piping component informed of an alloy comprising from 12% to 16% zinc, from 0.465% to 1.8% silicon, and a balance of copper (by weight), wherein a sum of the weight percentages of zinc, silicon, and copper in the alloy is at least 99.7%; and further wherein the alloy comprises an ultimate tensile strength of from 200 N/mm$^2$ to 300 N/mm$^2$, a yield strength of from 75 N/mm$^2$ to 225 N/mm$^2$, and a thermal conductivity, k, of from 30 W/m·K to 70 W/m·K.

2. The piping article of claim 1, wherein the alloy further comprises from 0.05% to 0.2% iron (by weight).

3. The piping article of claim 1, wherein the alloy further comprises from 0.03% to 0.09% phosphorous (by weight).

4. The piping article of claim 1, wherein the alloy further comprises from 0.03% to 0.09% arsenic (by weight).

5. The piping article of claim 1, wherein the alloy further comprises from 0.03% to 0.09% antimony (by weight).

6. The piping article of claim 1, wherein the alloy further comprises a maximum of 0.09% lead (by weight).

7. The piping article of claim 1, wherein the alloy comprises from 82.7% to 87.5% copper, from 12% to 16% zinc, from 0.5% to 1% silicon, up to 0.2% iron, and up to 0.08% phosphorous (by weight).

8. The piping article of claim 1, wherein the alloy comprises an elongation of from 15% to 65.3%.

9. The piping article of claim 1, wherein the alloy comprises 15% to 16% zinc (by weight).

10. A piping article, comprising: a piping component comprising a piping body with an open end, wherein the piping component informed of an alloy comprising from 12% to 16% zinc, from 0.465% to 1.8% silicon, and a balance of copper (by weight), wherein a sum of the weight percentages of zinc, silicon, and copper in the alloy is at least 99.7%; and further wherein the alloy comprises an ultimate tensile strength of 300 N/mm$^2$ or less, a yield strength of 225 N/mm$^2$ or less, and a thermal conductivity, k, of from 30 W/m·K to 70 W/m·K.

11. The piping article of claim 10, wherein the alloy comprises from 83.7% to 86.5% copper, from 13% to 15% zinc, and from 0.5% to 1% silicon (by weight).

12. The piping article of claim 10, wherein the ultimate tensile strength of the alloy is from 150 N/mm$^2$ to 300 N/mm$^2$, the yield strength of the alloy is from 50 N/mm$^2$ to 225 N/mm$^2$, and the alloy comprises an elongation of from 20% to 65.3%.

13. The piping article of claim 10, wherein the ultimate tensile strength of the alloy is from 200 N/mm$^2$ to 300 N/mm$^2$, the yield strength of the alloy is from 75 N/mm$^2$ to 225 N/mm$^2$, and the alloy comprises an elongation of from 25% to 65.3%.

14. The piping article of claim 10, wherein the ultimate tensile strength of the alloy is from 240 N/mm$^2$ to 280 N/mm$^2$, the yield strength of the alloy is from 90 N/mm$^2$ to 110 N/mm$^2$, and the alloy comprises an elongation of from 30% to 65.3%.

15. A piping article, comprising: a piping component comprising a piping body with an open end, wherein the piping component informed of an alloy comprising from 12% to 16% zinc, from 0.465% to 2% silicon, one or more of (i) from 0.02% to 0.09% phosphorous, (ii) from 0.02% to 0.09% arsenic, (iii) from 0.02% to 0.09% antimony, and (iv) up to 0.2% iron, and a balance of copper (by weight), wherein a sum of the weight percentages of zinc, silicon, and copper in the alloy is at least 99.7%; and further wherein the alloy comprises an ultimate tensile strength of 300 N/mm$^2$ or less, a yield strength of 225 N/mm$^2$ or less, a thermal conductivity, k, of 45 W/m·K to 70 W/m·K, and a DZ corrosion penetration depth of less than 200 μm according to the ISO 6509 testing method.

16. The piping article of claim 15, wherein the ultimate tensile strength of the alloy is from 200 N/mm$^2$ to 300 N/mm$^2$, the yield strength of the alloy is from 75 N/mm$^2$ to 225 N/mm$^2$, and the alloy comprises an elongation of from 20% to 65.3%.

17. The piping article of claim 15, wherein the alloy consists essentially of from 82.7% to 87.43% copper, from 12% to 16% zinc, from 0.5% to 1% silicon, from 0.05% to 0.2% iron, and from 0.02% to 0.08% phosphorous (by weight).

18. The piping article of claim 15, wherein the alloy consists essentially of from 82.7% to 85.5% copper, from 14% to 16% zinc, and from 0.5% to 1% silicon (by weight).

* * * * *

UNITED STATES PATENT AND TRADEMARK OFFICE
CERTIFICATE OF CORRECTION

PATENT NO. : 11,427,891 B2
APPLICATION NO. : 16/521189
DATED : August 30, 2022
INVENTOR(S) : Lawrence et al.

It is certified that error appears in the above-identified patent and that said Letters Patent is hereby corrected as shown below:

In the Specification

Column 18; Line 50:
"C 87500" should be —C 87600—.

Column 20; Line 26:
"C 87500" should be —C 87600—.

Column 21; Line 20:
"C 87500" should be —C 87600—.

In the Claims

Column 25; Claim 15; Line 8:
"informed" should be —is formed—.

Signed and Sealed this
Thirteenth Day of February, 2024

Katherine Kelly Vidal
*Director of the United States Patent and Trademark Office*